United States Patent
Chen et al.

(10) Patent No.: US 11,689,013 B2
(45) Date of Patent: Jun. 27, 2023

(54) SOURCE-NETWORK COORDINATION TYPE DIRECT-CURRENT (DC) CIRCUIT BREAKER BASED ON PRE-CHARGED CAPACITORS FOR MODULAR MULTILEVEL CONVERTERS (MMC) BASED DC GRID

(71) Applicant: Tianjin University, Tianjin (CN)

(72) Inventors: Xiaolong Chen, Tianjin (CN); Xiaowen Han, Zhangye (CN); Yongli Li, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 45 days.

(21) Appl. No.: 17/511,598

(22) Filed: Oct. 27, 2021

(65) Prior Publication Data
US 2022/0311241 A1   Sep. 29, 2022

(51) Int. Cl.
*H02H 7/26*   (2006.01)
*H02J 3/36*   (2006.01)
*H02M 1/32*   (2007.01)

(52) U.S. Cl.
CPC .............. *H02H 7/268* (2013.01); *H02J 3/36* (2013.01); *H02M 1/32* (2013.01)

(58) Field of Classification Search
CPC ............. H02H 7/268; H02J 3/26; H02M 1/32
See application file for complete search history.

(56) References Cited

U.S. PATENT DOCUMENTS

| 10,615,587 | B2* | 4/2020 | Gupta | H02H 7/268 |
| 2007/0086226 | A1* | 4/2007 | Mavier | H02M 7/53875 |
| | | | | 363/132 |
| 2017/0331390 | A1* | 11/2017 | Xu | H02J 3/36 |
| 2018/0241202 | A1* | 8/2018 | Mokhberdoran | H02H 9/02 |
| 2018/0287371 | A1* | 10/2018 | Nyberg | H02J 3/36 |
| 2019/0013662 | A1* | 1/2019 | Norrga | H02H 3/021 |
| 2020/0014190 | A1* | 1/2020 | Wen | H01H 33/596 |
| 2020/0328690 | A1* | 10/2020 | Venkataramanan | H02M 1/32 |
| 2020/0395757 | A1* | 12/2020 | Mukhedkar | H02J 3/36 |
| 2022/0045506 | A1* | 2/2022 | Wang | H01H 33/596 |

* cited by examiner

*Primary Examiner* — Rafael O De Leon Domenech
(74) *Attorney, Agent, or Firm* — Andrew C. Cheng

(57) ABSTRACT

A source-network coordination type direct-current (DC) circuit breaker based on pre-charged capacitors for an MMC based DC grid is provided. The MMC based DC grid is provided with four converter stations, each having two converters, which are in loop connection through a double-loop DC overhead line. Two ends of each DC line connecting the converters are separately equipped with DC circuit breakers for isolating a fault of the DC line. An MMC active voltage adjusting control strategy is matched with pre-charged capacitor voltage in the self-adaptive mode to provide a beneficial breaking condition for a quick mechanical switch branch, so that the fault line is effectively cut off.

6 Claims, 5 Drawing Sheets

SOURCE-NETWORK COORDINATION TYPE DIRECT-CURRENT (DC) CIRCUIT BREAKER BASED ON PRE-CHARGED CAPACITORS FOR MODULAR MULTILEVEL CONVERTERS (MMC) BASED DC GRID

TECHNICAL FIELD OF INVENTION

The invention belongs to the technical field of flexible DC grid protection and control, in particular to a source-network coordination type direct-current (DC) circuit breaker based on pre-charged capacitors for a modular multilevel converters (MMC) based DC grid.

BACKGROUND OF INVENTION

A new generation of transmission technology represented by flexible direct current has shown great development potential in long-distance large-capacity transmission occasions in recent years. With the development in high-voltage large-capacity flexible DC transmission as a result of MMC, MMC has become a first choice in a converter topology structure of a long-distance large-capacity flexible DC transmission system and will be widely applied in the field of flexible DC transmission.

To meet the needs of large-scale development of new energy and long-distance transmission, it will be an inexorable trend in the future to adopt an overhead line as a DC line in the flexible DC grid which is suitable for a long-distance large-capacity occasion. It is possible to have a sudden short circuit under impact of external environment as the overhead line needs to cross a plurality of complex geographic environments and climate environments. To solve the problem that an overhead line is liable to have a short-circuit fault, a high-speed large-capacity DC circuit breaker is generally adopted in engineering to passively isolate the short-circuit fault. Short-circuit current generally rises to a value dozens of a rated value within several milliseconds after the fault occurs due to low-resistance and low-inertia characteristics of the DC grid, thereby causing great developing difficulty in a high-speed large-breaking-capacity DC circuit breaker (DCCB). The DC grid is limited in development and construction as a result of strict technical indexes and a higher economic cost of the DCCB.

SUMMARY OF INVENTION

To sufficiently bring control ability of a converter into play and solve the problems that a DCCB in a flexible DC grid is great in breaking current, great in consumed energy and high in requirements on a breaking speed, the invention discloses a s source-network coordination type direct-current (DC) circuit breaker based on pre-charged capacitors for a modular multilevel converters (MMC) based DC grid. During a DC fault period, number of submodules in the converter is changed by a control strategy, so that DC voltage at an outlet of the converter is kept equal to pre-charged capacitor voltage at a network side to provide a beneficial breaking condition for a quick mechanical switch.

To achieve the objective, the invention adopts the following technical solution:

According to a source-network coordination type direct-current (DC) circuit breaker based on pre-charged capacitors for a modular multilevel converters (MMC) based DC grid, the MMC based DC grid is provided with four converter stations, each having two converters; the converters of the four converter stations are in loop connection through a double-loop DC overhead line; the two ends of each DC line connecting the converters are separately equipped with source-network coordination type DC circuit breakers based on pre-charged capacitors which are matched with an MMC active voltage adjusting control strategy in a self-adaptive mode to clear and isolate a fault while the DC line has the fault.

A topological structure of the source-network coordination type DC circuit breaker based on pre-charged capacitors includes:

a through-current branch including a quick mechanical switch $S_1$ and an IGBT switching transistor group $Q_1$ sequentially connected in series, where the other end of the quick mechanical switch $S_1$ is connected to a DC bus;

a pre-charged capacitor branch including a pre-charged capacitor group $C_1$, a diode valve group $D_1$, a thyristor valve group $T_1$ and an energy consumption resistor $R_1$, where ends, which are connected to one another in parallel, of the diode valve group $D_1$, the thyristor valve group $T_1$ and the energy consumption resistor $R_1$ are connected to the rear end of the IGBT switching transistor group $Q_1$, and the other ends thereof are connected to one end of the pre-charged capacitor group $C_1$ in series while the other end of the pre-charged capacitor group $C_1$ is grounded; and a current-limiting inductor branch including a current-limiting inductor $L_1$, where one end of the current-limiting inductor $L_1$ is connected to a node between the through-current branch and the pre-charged capacitor branch while the other end thereof is connected to the DC line.

The MMC active voltage adjusting control strategy is implemented by an active voltage adjusting controller; during normal operation, the active voltage adjusting controller is not in use and a voltage adjusting coefficient k is kept as 1; while a fault occurs, the active voltage adjusting controller is in use and the output voltage adjusting coefficient k is reduced within a range from 0 to 1, so that DC voltage at an outlet of the converter is equal to voltage of the pre-charged capacitor group of the circuit breaker on the fault line, and thus, voltage at the two ends of the quick mechanical switch $S_1$ is quickly clamped momentarily to provide a breaking condition for the quick mechanical switch $S_1$.

During the DC fault period, $k_{flt}$ is taken as a voltage adjusting coefficient for reducing a total number of submodules of each phase to $k_{flt}N_{ref}$ in a nearest electric level approaching and adjusting process, thereby realizing adjusting voltage at the DC side outlet of the converter.

When the DC grid normally operates, the pre-charged capacitor group $C_1$ needs to charge to a DC rated voltage, so that output voltage is reduced by adjusting the number of submodules in use of the converter to match with the voltage of the pre-charged capacitor group $C_1$ in a self-adaptive mode at a fault isolating stage, thereby momentarily clamping the voltage at the two ends of the quick mechanical switch to provide a breaking condition for the quick mechanical switch $S_1$.

When the DC grid has a fault, an attenuation speed of the voltage of the pre-charged capacitor group $C_1$ is different under different transition resistances. The voltage adjusting coefficient k is mutually matched with different transition resistances to adjust the cut-off number of the submodules in the self-adaptive mode, thereby simultaneously coping with a metal short-circuit fault and a high-resistance short-circuit.

When the DC grid has a fault, the fault is cleared by the following steps:

When a fault occurs at a to moment, the MMC converter discharges to the fault point, and the pre-charged capacitor group $C_1$ on the fault line discharges to the fault point through the diode valve group $D_1$ and a pre-charged capacitor group $C_i$ on the non-fault line discharges to the fault point through a diode valve group $D_i$ (i=2, 3), so that fault current quickly rises and the current-limiting inductor $L_1$ limits a rise rate of short-circuit current;

when a fault is detected at a $t_1$ moment, MMC is immediately put in use for active voltage adjusting control, so that the voltage is matched with the pre-charged capacitor voltage $u_{C1}$, the voltage at the DC side outlet of the converter is equal to the pre-charged capacitor voltage $u_{C1}$ by adjusting the number of switching submodules in the self-adaptive mode, and the thyristor valve group $T_i$ (i=2, 3) on the non-fault line is triggered to make preparation for power flow transfer in a process of cutting off the through-current branch on the fault line;

through delay for a certain time, the IGBT switching transistor group $Q_1$ on the through-flow branch is switched off at a $t_2$ moment to cut off current on the through-flow branch, so that preparation is made for quick arc-free breaking of the quick mechanical switch $S_1$; and after the IGBT switching transistor group $Q_1$ is switched off, preliminary isolation of the fault line is realized;

the quick mechanical switch $S_1$ is quickly broken at a $t_3$ moment while the number of submodules of the converter does not restore to a normal switching status; the pre-charged capacitor group $C_i$ (i=2, 3) on the non-fault line stops discharging for stabilizing DC bus voltage $u_{MMC}(t)$ unchanged before the quick mechanical switch $S_1$ is completely broken;

the quick mechanical switch $S_1$ is completely broken at a $t_4$ moment to realize physical isolation of the fault line while MMC active voltage adjusting control is released and the number of the submodules of the converter restores to the normal switching status; the pre-charged capacitor group $C_i$ (i=2, 3) on the non-fault line is recharged by the converter, is finally restored by oscillation and is stabilized at the DC rated voltage;

when the voltage of the pre-charged capacitor group $C_i$ (i=2, 3) on the non-fault line is stabilized, a trigger signal to the thyristor valve group $T_1$ (i=2, 3) on the non-fault line is stopped; and meanwhile, a fault loop forms a two-order oscillation circuit, current is oscillated and has follow-current consumption on the branch on which the energy consumption resistor $R_1$ is located, and the fault is cleared after energy consumption is ended. Compared with the prior art, the source-network coordination type DC circuit breaker based on pre-charged capacitors for the MMC based DC grid disclosed by the invention has the following beneficial effects:

Firstly, decoupling between fault isolation and fault energy consumption is realized, and slow energy consumption is achieved after quick isolation, so that a fault isolating speed is greatly increased, and therefore, the source-network coordination type DC circuit breaker based on pre-charged capacitors can be suitable for some quick working conditions, and has certain engineering guide significance.

Secondly, the pre-charged capacitor can reduce a release speed of capacitor energy of MMC submodules during the fault period, so that the MMC submodules can be prevented from being deeply discharged, and fault ride-through ability of the DC grid is strengthened; besides, a peak value of fault current during the fault period is further reduced by active voltage adjusting control, so that an interlocking risk due to through current of the converter is reduced.

Finally, the attenuation speed of pre-charged capacitor voltage is different under different transition resistances, and the voltage adjusting coefficient is mutually matched with the different transition resistances to adjust the cut-off number of the submodules in the self-adaptive mode, so that a metal short-circuit fault and a high-resistance short-circuit are simultaneously coped.

DETAILED DESCRIPTION OF PREFERRED EMBODIMENTS

The technical solutions of the invention will be described in detail in conjunction with the embodiments and accompanying drawings as follows.

A low-voltage and zero-current breaking condition is provided for the quick mechanical switch through source-network coordination in a mode of combining a source-side MMC active voltage adjusting control strategy with a topological structure of a network-side circuit breaker, thereby realizing effective cut-off of the fault line, reducing influences of fault current on a converter station, avoiding breakdown of bus voltage and guaranteeing normal operation of the non-fault line.

Figure 1:
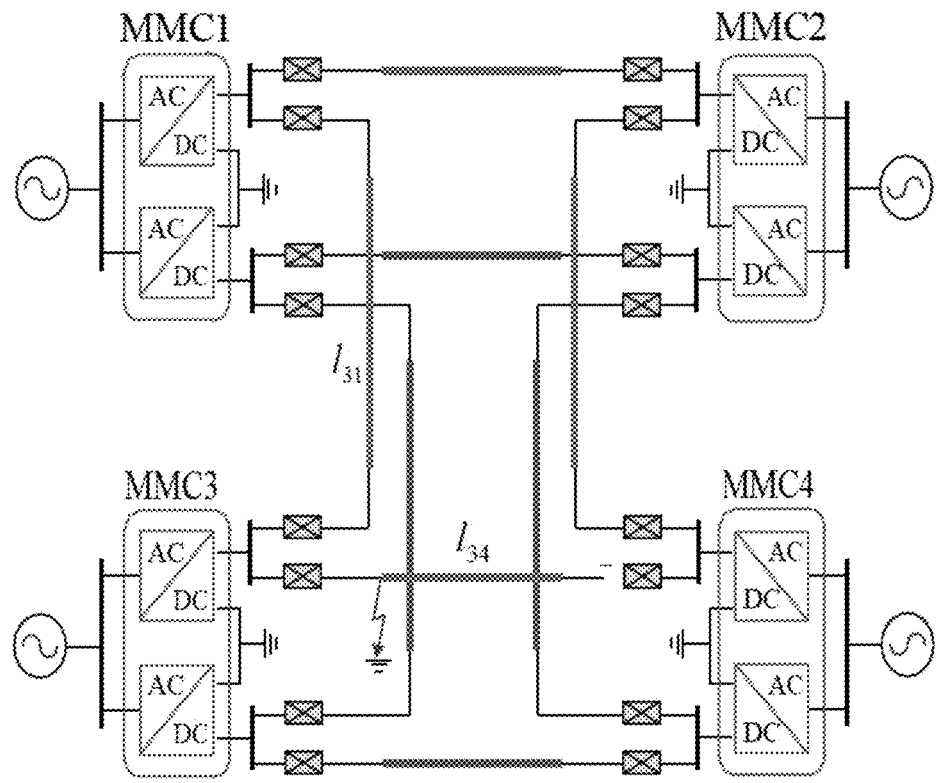
FIG. 1 is a schematic diagram showing an MMC four-end DC grid.

FIG. 1 is a topological diagram of a ±500 kV four-end MMC direct-current grid system. A network-side circuit breaker is mounted on each DC line, as shown in FIG. 1, the MMC based DC grid is provided with four converter stations MMC 1, MMC 2, MMC 3 and MMC 4, each having two converters; the converters of the four converter stations are in loop connection through a double-loop DC overhead line; the two ends of each DC line connecting the converters are separately equipped with source-network coordination type DC circuit breaker based on pre-charged capacitors which are matched with an MMC active voltage adjusting control strategy in a self-adaptive mode to clear and isolate a fault while the DC line has the fault.

Figure 5:
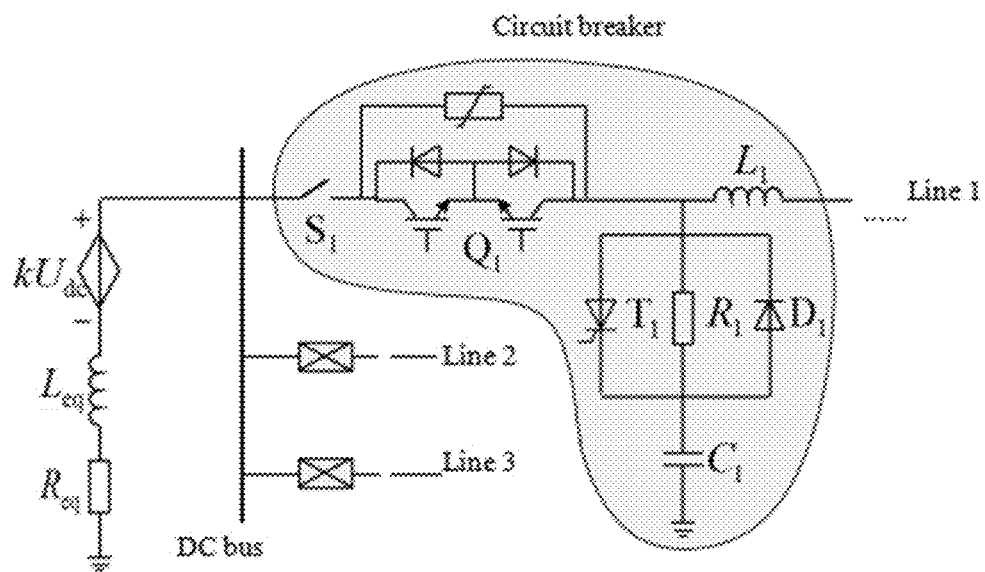
FIG. 5 is a topological structure of a network-side circuit breaker.

The source-network coordination type hybrid DC circuit breaker based on a pre-charged capacitor, namely a topological structure of a network-side circuit breaker is mounted on each DC outgoing line of the corresponding converter station; taking line 1 as an example, as shown in FIG. 5, the line 1 consists of a through-current branch, a pre-charged capacitor branch and a current-limiting inductor branch, where the through-current branch includes a quick mechanical switch $S_1$ and a reverse serial IGBT switching transistor group $Q_1$; the pre-charged capacitor branch includes a pre-charged capacitor group $C_1$, a diode valve group $D_1$, a thyristor valve group $T_1$ and an energy consumption resistor $R_1$; the current-limiting inductor branch includes a current-limiting inductor $L_1$; when the DC grid normally operates, the pre-charged capacitor needs to charge to a DC rated value for clearing the fault.

When a fault occurs, the attenuation speed of pre-charged capacitor voltage is different under different transition resistances, and the voltage adjusting coefficient is mutually matched with the different transition resistances to adjust the cut-off number of the submodules in the self-adaptive mode, so that a metal short-circuit fault and a high-resistance short-circuit are simultaneously coped.

It should be noted that in a specific design, components and parts in each valve group can be connected properly in series or parallel according to different application scenarios to match with system needs.

Figure 2:
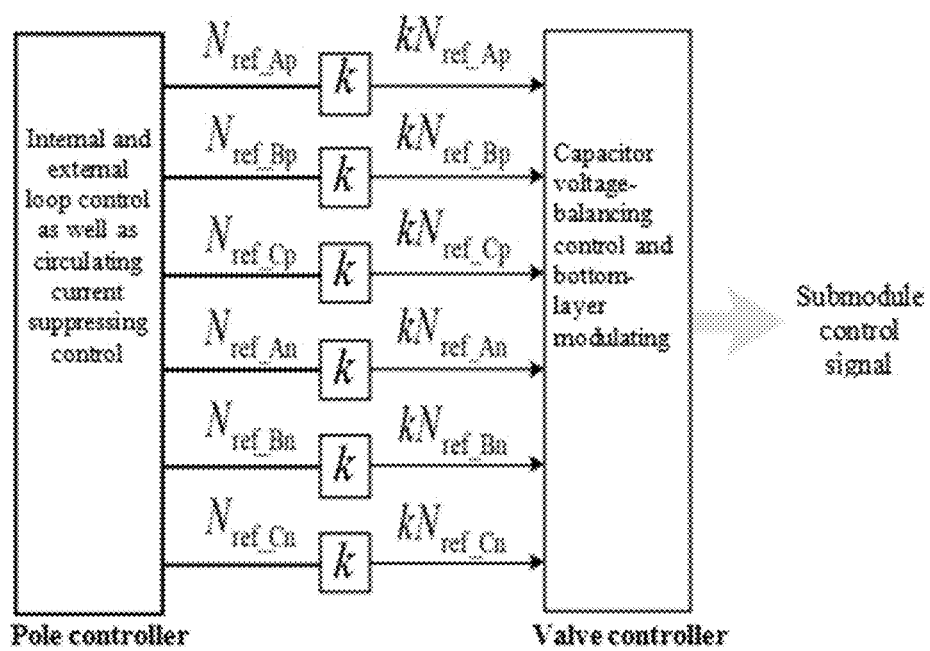
FIG. 2 is a diagram showing a realization principle of DC side active voltage adjusting of an MMC converter.

In the invention, the active voltage adjusting control strategy of the source-side converter is as follows: during the DC fault period, the total number of submodules in use of each phase Is reduced to kNref (k being the voltage adjusting coefficient which represents a proportion of submodules in use, k≤1) in a nearest electric level approaching and adjusting process, thereby realizing MMC active voltage adjusting. A control block diagram is as shown in FIG. 2, including an electrode controller for achieving internal and external loop control as well as circulating current suppressing control, and a valve controller for capacitor voltage-balancing control and bottom-layer control. $N_{ref\_Xp}$ and $N_{ref\_Xn}$ (X=A, B and C) are separately number of submodules of an upper bridge arm and a output lower bridge arm of MMC electrode controller output, and a product obtained by multiplying the output with the voltage adjusting coefficient k is taken as valve controller input, and finally a valve controller outputs a control signal of the submodules. When detecting a fault, the system switches to active voltage adjusting control to reduce a reference value of the number of the submodules to $kN_{ref}$ from $N_{ref}$, thereby reducing number of capacitors in a discharge status at the same moment and achieving adjustment on voltage at the DC side outlet of the converter.

Figure 4:
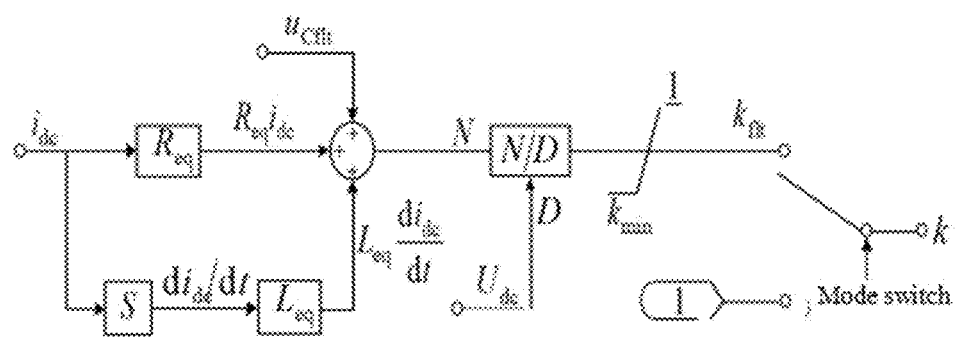
FIG. 4 is a structural diagram of an active voltage adjusting controller.

The active voltage adjusting control strategy of the source-side converter MMC is designed by the active voltage adjusting controller as shown in FIG. 4. During normal operation, the active voltage adjusting controller is not in use, and the voltage adjusting coefficient k is kept as 1. While a fault occurs, the active voltage adjusting controller is in use and the output voltage adjusting coefficient k is reduced within a range from 0 to 1, so that voltage at the DC side outlet of the converter is equal to voltage of the pre-charged capacitor group of the circuit breaker on the fault line, and thus, voltage at the two ends of the quick mechanical switch $S_i$ is quickly clamped momentarily to provide a breaking condition for the quick mechanical switch $S_1$.

Figure 3:
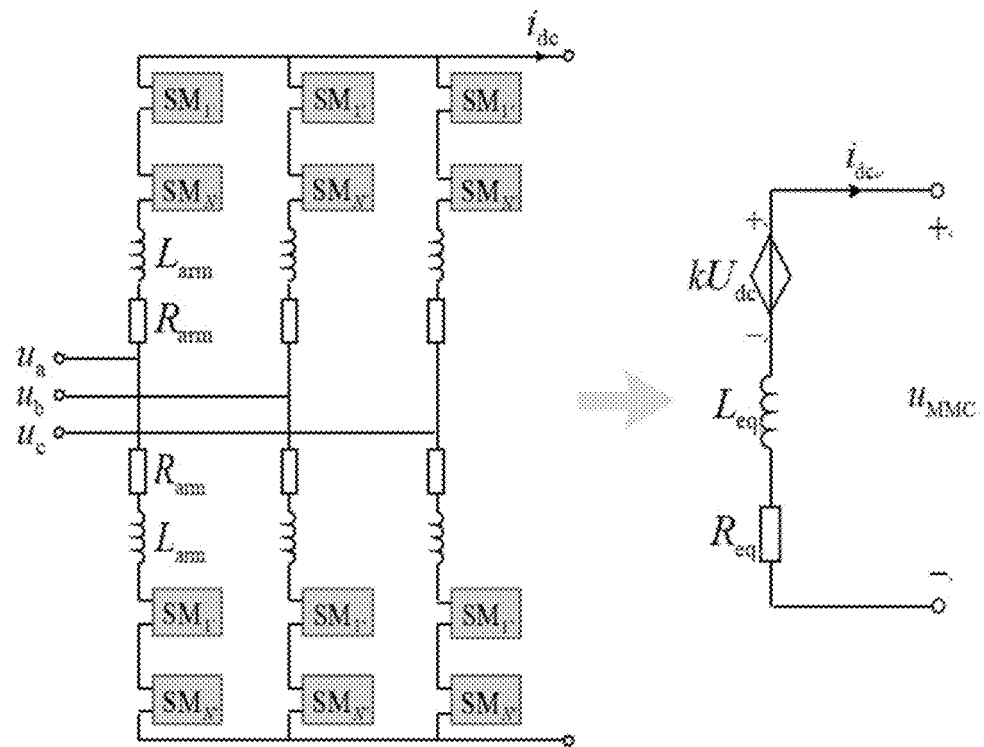
FIG. 3 is an MMC equivalent circuit of active voltage adjusting control.

In the invention, an equivalent circuit of the MCC converter adopting active voltage adjusting control is as shown in FIG. 3, an MCC converter circuit adopting active voltage adjusting control is at the left side, and an equivalent circuit thereof is at the right side; a controlled voltage source $kU_{dc}$ is sum of output voltage of single-phase submodules, $L_{arm}$ and $R_{arm}$ are bridge arm resistance and bridge arm inductance, $R_{eq}$ and $L_{eq}$ are equivalent resistance and equivalent inductance of the converter, where $R_{eq}$ is equal to $2R_{arm}/3$ and $L_{eq}$ is equal to $2L_{arm}/3$.

Output current idc of the MCC converter adopting active voltage adjusting control includes three phases, namely $U_a$, $U_b$ and $U_b$; each phase includes an upper bridge arm and a lower bridge arm; each of the upper bridge arm and the lower bridge arm includes KN same submodules SM1-N and bridge arm inductances $L_{arm}$ connected in series, where the bridge arm resistance Rarm, the bridge arm inductances $L_{arm}$ and the bridge arm resistance Rarm are connected to N same submodules SM1-N in series. Connecting points of bridge arm resistances Rarm of the upper bridge arm and the lower bridge arm of each phase are connected to the three phases, namely $U_a$, $U_b$ and $U_c$. After active voltage adjusting control is adopted, output voltage at the DC side of the converter station is as follows:

$$u_{MMC} = kU_{dc} - L_{eq}\frac{di_{dc}}{dt} - R_{eq}i_{dc} \qquad (1)$$

When a fault occurs, the output voltage $u_{MMC}$ at the DC side of the converter is equal to pre-charged capacitor voltage $u_{C1}$ in a self-adaptive mode through an MMC station end active voltage adjusting control strategy, $$u_{C1} = kU_{dc} - L_{eq}\frac{di_{dc}}{dt} - R_{eq}i_{dc} \qquad (2)$$

according to the formula (2), the voltage adjusting coefficient $k_{flt}$ of the MMC during a fault period satisfies the following formula:

$$k_{flt} = \frac{u_{C1} + L_{eq}\frac{di_{dc}}{dt} + R_{eq}i_{dc}}{U_{dc}} \qquad (3)$$

It can be seen from the formula (3) that in the active voltage adjusting controller as shown in FIG. 4, an input signal of an active voltage adjuster includes MMC direct current $i_{dc}$, MMC DC side voltage $U_{dc}$ and pre-charged capacitor voltage $u_{Cflt}$ of the fault line; an output signal is obtained through calculation based on the formula (3) so as to obtain a voltage adjusting coefficient $k_{flt}$ under a fault condition through a hysteresis comparator. During normal operation, the active voltage adjusting controller is not in use, and the voltage adjusting coefficient k is kept as 1. While a fault occurs, the active voltage adjusting controller is in use and $k_{flt}$ is taken as the voltage adjusting coefficient k, so that voltage at a DC side outlet of the converter is equal to voltage of the pre-charged capacitor group on the fault line in the self-adaptive mode, and thus, voltage at the two ends of the quick mechanical switch $S_1$ is quickly clamped momentarily to provide a breaking condition for the quick mechanical switch $S_1$.

The working principle of the DC circuit breaker is described by taking the short-circuit fault on the line 1 as an example.

Figure 6A:
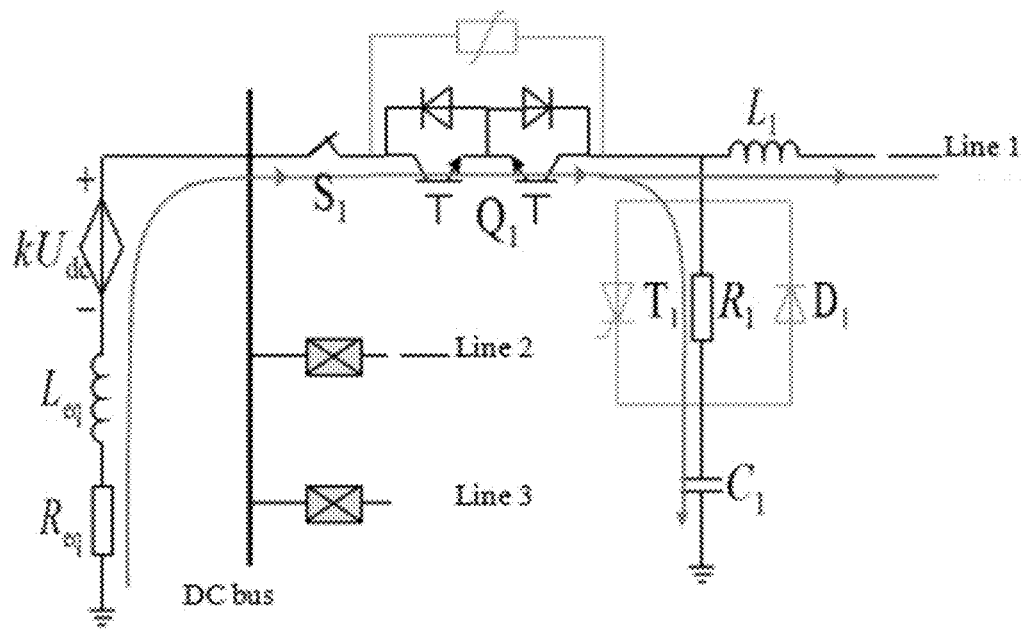
FIG. 6A through FIG. 6D showing working modes of a circuit breaker.

As shown in FIG. 5, if the DC bus is connected to three DC lines, the system transmits power through the quick mechanical switch $S_1$ and the IGBT switching transistor group $Q_1$ and also pre-charged the pre-charged capacitor group $C_1$ when the DC grid normally works, so that the thyristor valve group $T_i$ is kept in a blocking status and a conducting loop is as shown in FIG. 6A. Charging current $i_C(t)$ of the pre-charged capacitor group is as shown in formula (4).

$$i_C(t) = \frac{U_{dc}}{R_1 C}e^{-\frac{1}{R_1 C}t} \qquad (4)$$

Where, $U_{dc}$ is DC rated voltage.

Obviously, the energy consumption resistor $R_1$ in the circuit breaker affects the size of the pre-charging current $i_C$, and therefore, the parameters of the energy consumption resistor $R_1$ can be designed for effectively controlling charging current, thereby avoiding greater influences on system power flow.

When the line 1 has a fault (at a moment to), the current of the line is quickly increased;

1) a fault isolating stage (stage 1)

Figure 6B:
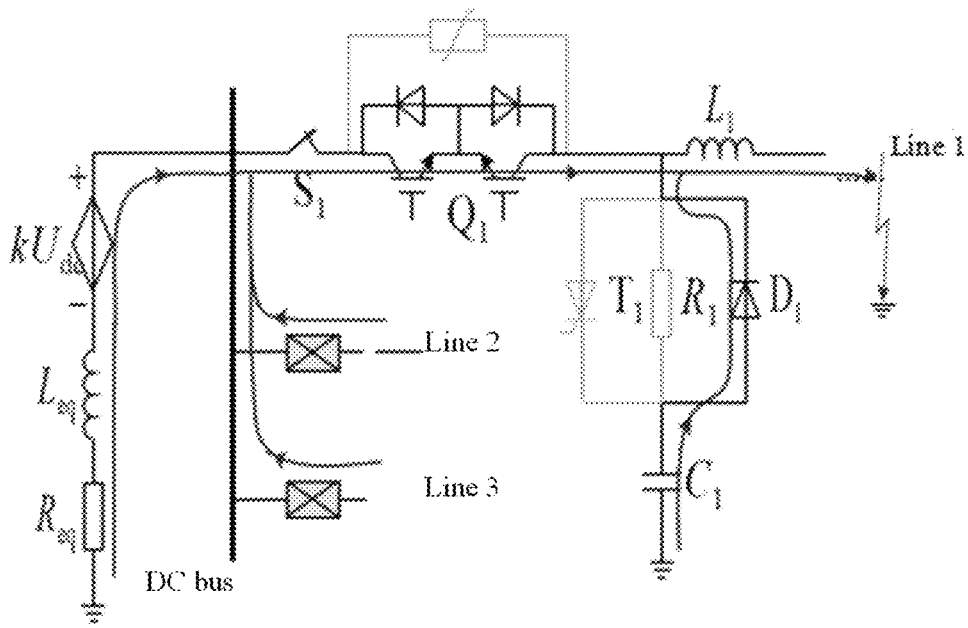

Before the system detects the $t_1$ moment at which the short-circuit faults occurs, the MMC converter discharges to the fault point, and the pre-charged capacitor group $C_1$ on the fault line discharges to the fault point through the diode valve group $D_1$ and a pre-charged capacitor group $C_i$ on the non-fault line discharges to the fault point through a diode valve group $D_i$ (i=2, 3), so that the conduction loop is shown in FIG. 6B. current-limiting inductor $L_1$ can effectively limits a rise rate of short-circuit current. Expressions of fault current $i_k(t)$ at the fault point and pre-charged capacitor voltage $u_{C1}(t)$ on the fault line are shown in formulas (5) and (6):

$$i_k(t) = \frac{U_{dc}}{L_1(\beta_1 - \beta_2)}\left(e^{\beta_1(t-t_0)} - e^{\beta_2(t-t_0)}\right), t_0 < t \le t_2 \quad (5)$$

$$u_{C1}(t) = \frac{U_{dc}}{\beta_1 - \beta_2}\left(-\beta_2 e^{\beta_1(t-t_0)} + \beta_1 e^{\beta_2(t-t_0)}\right), t_0 < t \le t_2 \quad (6)$$

Where, $R_g$ is transition resistance, and $\beta_1$ and $\beta_2$ are separately as follows:

$$\beta_1 = -\frac{R_g}{2L_1} + \sqrt{\left(\frac{R_g}{2L_1}\right)^2 - \frac{1}{L_1(C_1 + C_2 + C_3)}} \quad (7)$$

$$\beta_2 = -\frac{R_g}{2L_1} - \sqrt{\left(\frac{R_g}{2L_1}\right)^2 - \frac{1}{L_1(C_1 + C_2 + C_3)}} \quad (8)$$

It can be known from the formulas (5) and (6) that $i_k(t)$ and $u_{C1}(t)$ are affected by current-limiting inductor and pre-charged capacitor:

a) along with increase of current-limiting inductor $L_1$ of the circuit breaker, discharge current of pre-charged capacitor in a fault cut-off process can be effectively reduced;

b) the pre-charged capacitor on the fault line and the pre-charged capacitor on the non-fault line are connected in parallel, so that an equivalent capacitance is increased, and a decrease rate of pre-charged capacitor voltage can be reduced to certain extent, and thus, voltage of the grid is prevented from greater fluctuation; and c) similarly, if there are many outgoing lines of the DC bus, size of the pre-charged capacitor can be correspondingly reduced, and thus, the size and the cost of the circuit breaker are favorably reduced.

Figure 6C:
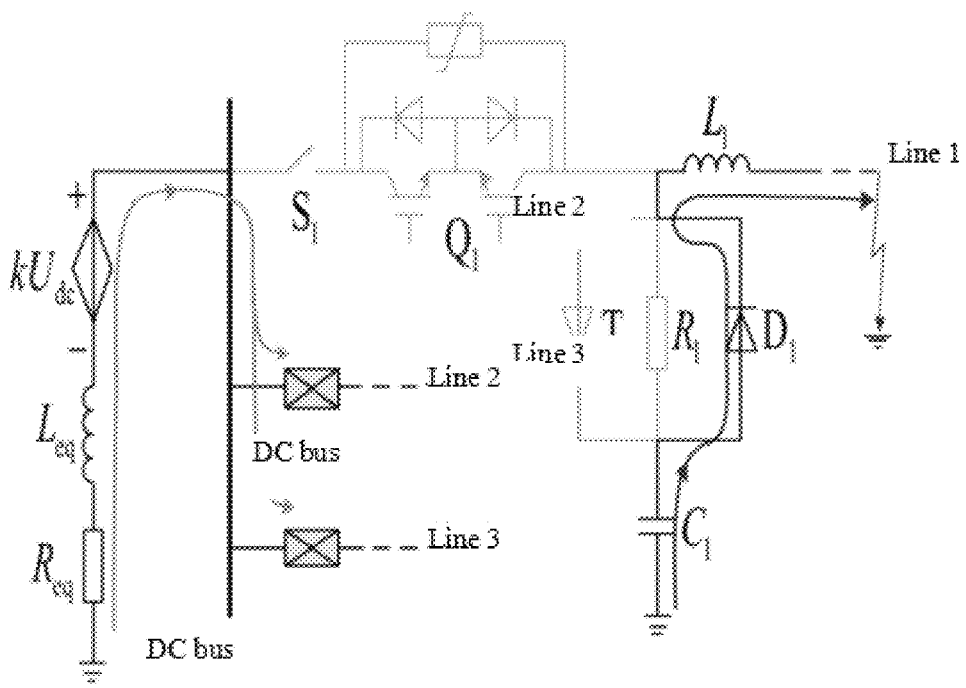

2) A Fault Isolating Stage (Stage 2)

when a fault is detected at a $t_1$ moment, MMC converter is immediately put in use for active voltage adjusting control, so that the voltage is matched with the pre-charged capacitor voltage, and thus, voltage at the DC side outlet of the converter is equal to the pre-charged capacitor voltage $C_1$ by adjusting the number of sub modules in the self-adaptive mode, and the thyristor valve group $T_i$ (i=2, 3) on the non-fault line is triggered to make preparation for power flow transfer in a process of cutting off the through-current branch of the fault line;

through delay for a certain time, the IGBT switching transistor group $Q_1$ on the through-flow branch is switched off at a $t_2$ moment to cut off current on the through-flow branch, so that preparation is made for quick arc-free breaking of the quick mechanical switch $S_1$. The conduction loop is as shown in FIG. 6C, the pre-charged capacitor group $C_1$ continuously discharges to a short-circuit point through the diode valve group $D_1$, and uC1(t) is continuously reduced with an expression as follows:

$$u_{C1}(t) = \frac{U_0}{\beta_3 - \beta_4}\left(-\beta_4 e^{\beta_3(t-t_2)} + \beta_3 e^{\beta_4(t-t_2)}\right), t_2 < t \le t_4 \quad (9)$$

$U_0$ is bus voltage of the converter at the $t_2$ moment, and expressions $\beta_1$, $\beta_2$ and $U_0$ are separately as follows:

$$\beta_1 = -\frac{R_g}{2L_1} + \sqrt{\left(\frac{R_g}{2L_1}\right)^2 - \frac{1}{L_1 C_1}} \quad (10)$$

$$\beta_2 = -\frac{R_g}{2L_1} - \sqrt{\left(\frac{R_g}{2L_1}\right)^2 - \frac{1}{L_1 C_1}} \quad (11)$$

$$U_0 = \frac{U_{dc}}{\beta_1 - \beta_2}\left(-\beta_2 e^{\beta_1(t_2-t_0)} + \beta_1 e^{\beta_2(t_2-t_0)}\right) \quad (12)$$

After the IGBT switching transistor group $Q_1$ is switched off, preliminary isolation of the fault line is realized, and the quick mechanical switch $S_1$ starts to break at a $t_3$ moment. While the number of submodules of the converter does not restore to a normal switching status, the pre-charged capacitor on the non-fault line stops discharging for stabilizing DC bus voltage $u_{MMC}(t)$ unchanged before the quick mechanical switch $S_1$ is completely broken, and $u_{MMC}(t)$ is as follows:

$$u_{MMC}(t) = U_0, t_2 < t \le t_4 \quad (13)$$

Voltage $u_T(t)$ at the two ends of the through-flow branch is a difference between DC bus voltage $u_{MMC}(t)$ and pre-charged capacitor voltage $u_{C1}(t)$, with an expression as follows:

$$u_T = u_{MMC} - u_{C1}(t), t_3 < t \le t_4 \quad (14)$$

When the pre-charged capacitance value is relatively great, voltage drop is slow, and maximum voltage $u_{Tmax}$ at the IGBT switch tube of the through-flow branch is small; when the pre-charged capacitance value is small, capacitance drop is quick, and maximum voltage $u_{Tmax}$ at the IGBT switch tube of the through-flow branch is great. That is to say, the greater the capacitance value, the lower the voltage withstand requirements of the IGBT switch tube; the smaller the capacitance value, the higher the voltage withstand requirements of the IGBT switch tube. If the voltage-resistance level of the IGBT switch tube needs to increase, number of the IGBT switch tubes connected in series needs to increase, which affects on-off action consistency and increases line on-state loss, and therefore, it is crucial to design a reasonable pre-charged capacitance value.

3) An Energy Consumption Stage (Stage 3)

Figure 6D:
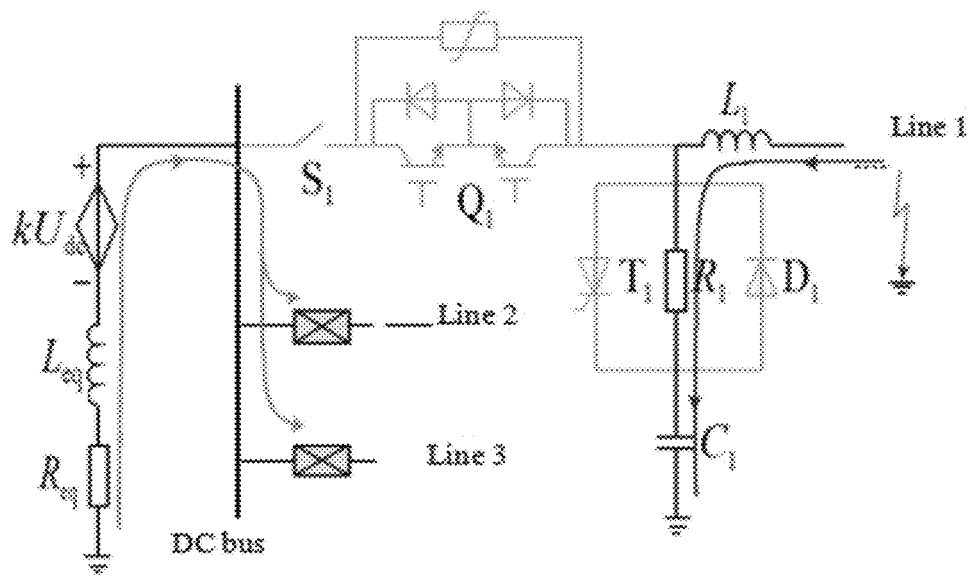

Through delay for certain time, the quick mechanical switch $S_1$ is completely broken at a $t_4$ moment to realize physical isolation of the fault line while active voltage adjusting control is released and the number of the submodules of the converter restores to the normal switching status. The Pre-charged capacitor group $C_1$ (i=2, 3) on the non-fault line is recharged by the converter, is finally restored by oscillation and is stabilized at the DC rated voltage. When the voltage of the pre-charged capacitor group on the non-fault line is stabilized, a trigger signal to the pre-charged capacitor group $C_i$ (i=2, 3) on the non-fault line is stopped; and meanwhile, a fault loop forms a two-order oscillation circuit, current is oscillated and has follow-current consumption on a branch on which the energy consumption resistor $R_1$ is located, and the conduction loop is as shown in FIG. 6D.

In practical application, the pre-charged capacitor on the fault line and the pre-charged capacitor on the non-fault line are connected in parallel to discharge, and therefore, the pre-charge capacitance value can be properly reduced while outgoing lines of the DC bus are more. In addition, the voltage drop time of the pre-charged capacitor during the fault period is shortened and the capacitance value also can be properly reduced along with improvement in technical level of the quick mechanical switch and reduction in action time. The two factors are beneficial for reducing the cost of the circuit breaker and reducing the size of the circuit breaker. In practical application, the pre-charged capacitor on the fault line and the pre-charged capacitor on the non-fault line are connected in parallel to discharge, and therefore, the pre-charged capacitance value can be properly reduced while outgoing lines of the DC bus are more. Requirements on a capacitor beside the line can be reduced along with improvement in development level of the quick mechanical switch and reduction of action time, and therefore, the cost and the size of the circuit breaker are favorably reduced.

It needs to be noted that in the invention, the pre-charged capacitor is a high-voltage capacitor which has DC rated voltage after being charged during a normal operation period of the system. The pre-charged capacitor is matched with the MMC converter active voltage adjusting control strategy during the fault period, so that the DC outlet voltage of the converter is equal to the voltage of the pre-charged capacitor in the self-adaptive mode to provide a beneficial condition for breaking the through-current branch.

During the fault period, number of the submodules is reduced after the MMC is switched to the active voltage adjusting control, so that alternating-current outlet voltage thereof is reduced. It is necessary to reasonably design a parameter selecting principle of voltage adjusting control according to strength of an alternating-current system connected to the converter station.

To reduce influences on the alternating-current system while adjusting voltage at the DC side, a minimum value on the voltage adjusting coefficient $k_{ft}$ is limited according to the strength of the alternating-current system connected to the converter station, where the minimum value is met by selecting the pre-charged capacitance value. It can be known from the formula (3) that the equivalent inductance and the equivalent resistance of the converter are given values, and therefore, only the voltage of the pre-charged capacitor can be adjusted; the drop speed of the voltage of the pre-charged capacitor is associated with the size of the capacitance value, and therefore, the minimum value of the voltage adjusting coefficient can be met by adjusting the size of the capacitance value of the pre-charged capacitor.

If the minimum value allowed of the voltage adjusting coefficient during the fault period is $k_{min}$ according to the strength of the alternating-current system connected to the converter station, DC voltage at the outlet of the corresponding converter is as follows:

$$u_{MMC\_min} = \left(k_{min}U_{dc} - L_{eq}\frac{di_{dc}}{dt} - R_{eq}i_{dc}\right)|_{t=t_A} \quad (15)$$

It can be known from the formula (13) that the DC voltage at the side outlet of the MMC converter when the adjusting voltage adjusting control exits is $U_0$, and therefore, the valuing range of the capacitance value of the pre-charged capacitor is determined based on the formula (16).

$$U_0 > u_{MMC\_min} \quad (16)$$

Figure 7:
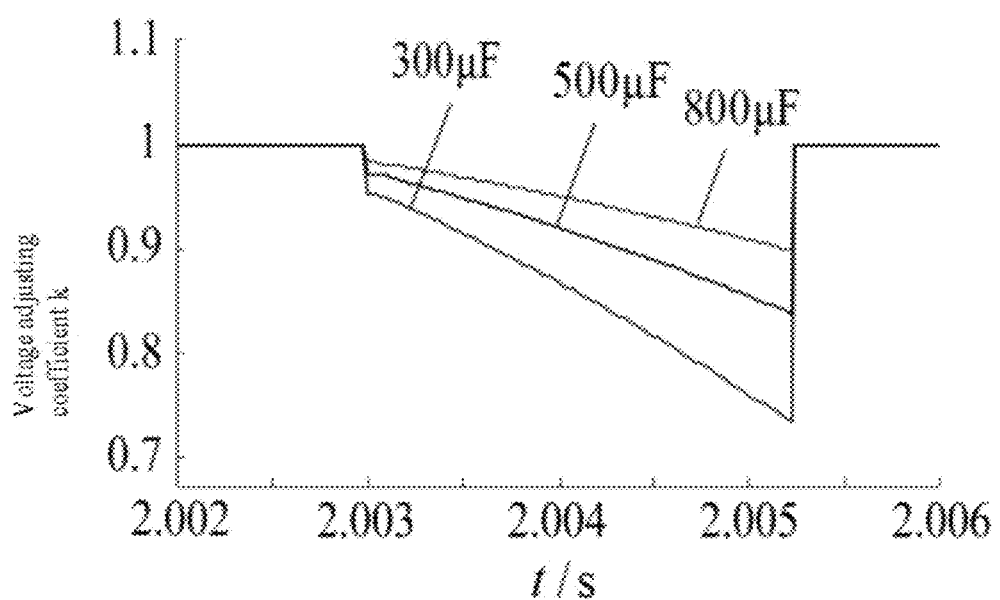
FIG. 7 is a diagram showing an influence relationship on a voltage adjusting coefficient by a pre-charged capacitor value.

FIG. 7 intuitively shows the change rule, along with the capacitance value of the pre-charged capacitor, of the voltage adjusting coefficient while capacitance values of the pre-charged capacitors are separately 300 µF, 500 µF and 800 µF. It can be known from the figures that the voltage adjusting coefficient is reduced slowly along with increase of the capacitance value, where the minimum value $k_{min}$ is increased.

The greater the voltage adjusting coefficient $k_{ft}$ during the fault period, the smaller the influence on the alternating-current system, and the size of the capacitance value of the pre-charged capacitor can be reasonably selected according to the strength of the alternating-current system.

In the invention, the energy consumption resistor $R_1$ is an energy consumption element in the circuit breaker, which is used to consume residual energy of the pre-charged capacitor and the current-limiting inductor on the fault line after fault isolation. The size of the energy consumption resistor determines the duration of residual energy release; after the quick mechanical switch is completely broken, the fault loop is a two-order oscillating circuit; at critical damping, the duration for consuming the residual energy is shortest, and the size of the energy consumption resistor $R_1$ is determined based on the formula (17).

$$R_1 = 2\sqrt{\frac{L_1}{C_1}} \quad (17)$$

When the system normally operates, the energy consumption resistor $R_1$ also achieves the effect of limiting the size of pre-charged current, and therefore, the size of the energy consumption resistor can be designed according to a practical condition. The voltage of the IGBT switch tube valve group on the through-current branch is small, and therefore, a number of IGBT switch tubes connected in series is small. If the maximum voltage on the IGBT switch tube valve group on the through-current branch during the fault period is $U_{IGBT\_max}$, the breaking ability required is $I_{IGBT\_max}$. If withstand voltage of single IGBT switch tube is $U_{IGBT}$ and the maximum withstand voltage is $I_{IGBT}$, the number of IGBT switch tube components needed is as follows:

$$n_{IGBT} = \frac{U_{IGBT\_max}}{U_{IGBT}} \frac{I_{IGBT\_max}}{I_{IGBT}} \quad (18)$$

In a high-voltage application occasion, the pre-charged capacitor branch of the circuit breaker needs to withstand DC rated voltage, and therefore, a certain number of switch components need to connect in the thyristor valve group and the diode tube valve group in the pre-charged capacitor branch in series. In addition, if the system requires higher breaking ability, each valve group needs to equip with switch components in parallel to meet the requirements.

If the maximum voltage on the thyristor valve group $T_1$ during the fault period is $U_{T1\_max}$, the maximum current flowing through is $I_{T1\_max}$, withstand voltage of single required is $I_{SCR}$, the number of switch components needed for the thyristor valve group is as follows:

$$n_{T1} = \frac{U_{T1\_max}}{U_{SCR}} \frac{I_{T1\_max}}{I_{SCR}} \quad (19)$$

If the maximum reverse voltage drop of the diode valve group $D_1$ during the fault period is $U_{D1\_max}$, the maximum breakover current is D1_max, the reverse withstand voltage of single diode is $U_R$, the maximum withstand current is $I_F$, the number of switch components needed for the diode valve group is as follow $$n_{D1} = \frac{U_{D1\_max}}{U_R} \frac{I_{D1\_max}}{I_F} \quad (20)$$

The invention discloses a source-network coordination type DC circuit breaker based on pre-charged capacitors for an MMC based DC grid. A low-voltage and zero-current breaking condition is provided for the quick mechanical switch in a mode of coordinating a source-side MMC active voltage adjusting control strategy with pre-charged capacitor voltage in a self-adaptive mode, thereby realizing effective cut-off of the fault line, reducing influences of fault current on a converter station in the presence of a pre-charged capacitor, avoiding breakdown of bus voltage and guaranteeing normal operation of the non-fault line. The circuit breaker disclosed by the prevent invention has greater economic benefits for a complex grid in in which single converter station bus is connected to a plurality of outgoing lines.

The above are embodiments of the invention, which are not intended to limit the system and the method disclosed by the invention. Therefore, the protection scope of the invention is subject to the protection scope in claims.

All obvious modifications and variations made by a person skilled in the art on forms and details without departing from the spirit and scope of the invention shall fall within the scope of the invention.

What is claimed is:

1. A source-network coordination type direct-current (DC) circuit breaker based on pre-charged capacitors for a modular multilevel converters (MMC) based DC grid, wherein the MMC based DC grid is provided with four converter stations, each having two converters; the converters of the four converter stations are in loop connection through a double-loop DC overhead line; two ends of each DC line connecting the converters are separately equipped with the source-network coordination type DC circuit breakers based on pre-charged capacitors which are matched with an MMC active voltage adjusting control strategy in a self-adaptive mode to clear an isolating fault while the DC line has the fault;

wherein a topological structure of the source-network coordination type DC circuit breaker based on pre-charged capacitors comprises:

a through-current branch, wherein the through-current branch comprises a quick mechanical switch (Si) and an insulated gate bipolar transistor (IGBT) switching transistor group (Qi) which are sequentially connected in series, and another end of the quick mechanical switch (Si) is connected to a DC bus;

a pre-charged capacitor branch, wherein the pre-charged capacitor branch comprises a pre-charged capacitor group (Ci), a diode valve group (Di), a thyristor valve group (Ti) and an energy consumption resistor (Ri); ends, which are connected to one another in parallel, of the diode valve group (Di), the thyristor valve group (Ti) and the energy consumption resistor (Ri) are connected to a rear end of the IGBT switching transistor group (Qi), and the other ends thereof are connected to one end of the pre-charged capacitor group (Ci) in series while the other end of the pre-charged capacitor group (Ci) is grounded; and a current-limiting inductor branch, wherein the current-limiting inductor branch comprises a current-limiting inductor (Li), one end of the current-limiting inductor (Li) is connected to a node between the through-current branch and the pre-charged capacitor branch while the other end thereof is connected to the DC line.

2. The source-network coordination type DC circuit breaker based on pre-charged capacitors for the MMC based DC grid according to claim 1, wherein the MCC active voltage adjusting control strategy is implemented by an active voltage adjusting controller; during a normal operation, the active voltage adjusting controller is not in use and a voltage adjusting coefficient k is kept as 1; while a fault occurs, the active voltage adjusting controller is in use and the voltage adjusting coefficient k as output is reduced within a range from 0 to 1, so that voltage at a DC side outlet of the converter is equal to voltage of the pre-charged capacitor group of the circuit breaker on the fault line, and thus, voltage at the two ends of the quick mechanical switch ($S_1$) is clamped momentarily to provide a breaking condition for the quick mechanical switch ($S_1$).

3. The source-network coordination type DC circuit breaker based on pre-charged capacitors for the MMC based DC grid according to claim 1, wherein when a DC fault occurs, $k_{flt}$ is taken as a voltage adjusting coefficient for reducing a total number of submodules of phases to $k_{flt}N_{ref}$ in a nearest electric level approaching and adjusting process, thereby realizing adjusting of voltage at a DC side outlet of the converter.

4. The source-network coordination type DC circuit breaker based on pre-charged capacitors for the MMC based DC grid according to claim 1, wherein when the DC grid normally operates, the pre-charged capacitor group ($C_1$) needs to charge to a DC rated voltage, so that output voltage is reduced by adjusting the number of submodules in use of the converter to match with voltage of the pre-charged capacitor group ($C_1$) in a self-adaptive mode at a fault isolating stage, thereby momentarily clamping voltage at the two ends of the quick mechanical switch to provide a breaking condition for the quick mechanical switch ($S_1$).

5. The source-network coordination type DC circuit breaker based on pre-charged capacitors for the MMC based DC grid according to claim 1, wherein when the DC grid has a fault, attenuation speeds of the voltage of the pre-charged capacitor group $C_1$ are different under different transition resistances; a voltage adjusting coefficient (k) is mutually matched with different transition resistances to adjust a cut-off number of submodules in the self-adaptive mode, thereby simultaneously coping with a metal short-circuit fault and a high-resistance short-circuit.

6. The source-network coordination type DC circuit breaker based on pre-charged capacitors for the MMC based DC grid according to claim 1, wherein when the DC grids has a fault, the fault is cleared by the following steps:

when the fault occurs at a t0 moment, the converter discharges to a fault point, and the pre-charged capacitor group ($C_1$) on the fault line discharges to the fault point through the diode valve group ($D_1$) and the pre-charged capacitor group ($C_i$, where i=2, 3) on a non-fault line discharges to the fault point through the diode valve group ($D_i$, where i=2, 3), so that fault current rises and the current-limiting inductor ($L_1$) limits a rise rate of short-circuit current;

when a fault is detected at a $t_1$ moment, an MMC active voltage adjusting control is immediately put in use, so that voltage is matched with a pre-charged capacitor voltage ($u_{C1}$), voltage at a DC side outlet of the converter is equal to the pre-charged capacitor voltage ($u_{C1}$) by adjusting the number of submodules in the self-adaptive mode, and the thyristor valve group ($T_i$, where i=2, 3) on the non-fault line is triggered to make preparation for power flow transfer in a process of cutting off the through-current branch on the fault line;

through delay for a certain time, the IGBT switching transistor group ($Q_1$) on the through-flow branch is switched off at a $t_2$ moment to cut off current on the through-flow branch, so that preparation is made for quick arc-free breaking of the quick mechanical switch ($S_1$); and after the IGBT switching transistor group ($Q_1$) is switched off, preliminary isolation of the fault line is realized;

the quick mechanical switch $S_1$ is broken at a $t_3$ moment while the number of submodules of the converter does not restore to a normal switching status; the pre-charged capacitor group ($C_i$, where i=2, 3) on the non-fault line stops discharging for stabilizing DC bus voltage ($u_{MMC}(t)$) unchanged before the quick mechanical switch $S_1$ is completely broken;

the quick mechanical switch $S_1$ is completely broken at a $t_4$ moment to realize physical isolation of the fault line while the MCC active voltage adjusting control is released and the number of the submodules of the converter restores to the normal switching status; the pre-charged capacitor group ($C_i$, where i=2, 3) on the non-fault line is recharged by the converter, is finally restored by oscillation and is stabilized at a DC rated voltage;

when the voltage of the pre-charged capacitor group ($C_i$, where i=2, 3) on the non-fault line is stabilized, a trigger signal to the thyristor valve group ($T_1$, where i=2, 3) on the non-fault line is stopped; and meanwhile, a fault loop forms a two-order oscillation circuit, current is oscillated and has follow-current consumption on a branch on which the energy consumption resistor ($R_1$) is located, and the fault is cleared after energy consumption is ended.

* * * * *